(12) United States Patent
Nagai et al.

(10) Patent No.: US 8,182,132 B2
(45) Date of Patent: May 22, 2012

(54) MULTISTAGE-MIXING MICRODEVICE

(75) Inventors: Youichi Nagai, Ashigarakami-gun (JP);
Kazuhiro Mae, Kyoto (JP); Nobuaki Aoki, Kyoto (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 854 days.

(21) Appl. No.: 12/185,250

(22) Filed: Aug. 4, 2008

(65) Prior Publication Data

US 2009/0038699 A1 Feb. 12, 2009

(30) Foreign Application Priority Data

Aug. 10, 2007 (JP) ................ 2007-210487

(51) Int. Cl.
*B01F 5/06* (2006.01)
*B01F 15/06* (2006.01)

(52) U.S. Cl. .............. 366/147; 366/173.1; 366/336; 366/DIG. 2

(58) Field of Classification Search .......... 366/144–149, 366/181.5, 336–340, 167.1, 173.1, 173.2, 366/DIG. 1, DIG. 2
See application file for complete search history.

(56) References Cited

U.S. PATENT DOCUMENTS

| | | | | |
|---|---|---|---|---|
| 5,720,551 A * | 2/1998 | Shechter | ...................... | 366/147 |
| 6,413,706 B1 * | 7/2002 | Nakanishi et al. | ............. | 430/546 |
| 6,443,610 B1 * | 9/2002 | Shechter et al. | ........... | 366/162.4 |
| 6,749,329 B2 * | 6/2004 | Shechter et al. | ............... | 366/101 |
| 6,764,213 B2 * | 7/2004 | Shechter | .................... | 366/167.1 |
| 7,284,899 B2 * | 10/2007 | Nakano | ........................ | 366/176.1 |
| 7,380,976 B2 * | 6/2008 | Mattison et al. | .............. | 366/149 |
| 2005/0041523 A1 * | 2/2005 | Nakano | ....................... | 366/176.1 |

FOREIGN PATENT DOCUMENTS

| | | |
|---|---|---|
| JP | 10-337173 A | 12/1998 |
| JP | 2000-298109 A | 10/2000 |
| JP | 2005-161125 | 6/2005 |
| JP | 2006-241065 A | 9/2006 |
| JP | 2006-281008 A1 | 10/2006 |
| JP | 2009131779 A * | 6/2009 |
| WO | WO 8202004 A1 * | 6/1982 |

OTHER PUBLICATIONS

Japanese Notice of Reasons for Rejection dated Jan. 31, 2012 issued in the corresponding Japanese Patent Application No. 2007-210487 and partial English-language translation.

* cited by examiner

*Primary Examiner* — Charles E Cooley
(74) *Attorney, Agent, or Firm* — Buchanan Ingersoll & Rooney PC (57) ABSTRACT

A microdevice for multistage-mixing of process fluids which has plurality of freely-detachable units connected to each other without using pipes, wherein a microchannel for flow of the process fluids and a channel for flow of a heat-exchange medium are formed in the microdevice by mutual connection of a plurality of the units and the microdevice is locally and independently temperature-controllable.

20 Claims, 3 Drawing Sheets

MULTISTAGE-MIXING MICRODEVICE

FIELD OF THE INVENTION

The present invention relates to a microdevice mixing a plurality of fluids at a plurality of stages.

BACKGROUND OF THE INVENTION

Recently, a technology, so-called "microchemical process technology", of performing chemical reaction in a reaction channel having fine channel sectional area is under development (JP-A-2000-298109 ("JP-A" means unexamined published Japanese patent application)). The "microchemical process technology" is a method of producing or analyzing substances chemically by using chemical and physical phenomena exhibited in microchannel having a width of several μm to hundreds of μm that is formed on a solid substrate for example by micro-processing technology.

Fluids move mostly in laminar flow in microspaces where the Reynolds number is normally lower and are often mixed through an interface by molecular diffusion. In such a microspace where the specific surface area of the interface is larger and the molecule travelling distance can be lowered, the fluids are mixed instantaneously through the interface by molecule diffusion. Thus, it is possible to mix fluids more rapidly and accurately than by turbulent flow mixing with a common macroscale stirrer. In addition, it is also possible to control the flow rate and the reaction time accurately, because the reaction is generally performed in the flow state. It is also possible to control the temperature more accurately, because heat transfer is easier.

However, in conventionally proposed microdevices, it was necessary to isolate a product obtained in a microdevice and supply it into another microdevice, for mixing and reaction of a plurality of fluids in a plurality of phases. In such a case, two microdevices should be connected with a joint for connection. Accordingly, there was limit in reducing the volume of the connection region, and thus, it was difficult to control the temperature and the residence time in the connection region. In particular, such a system cannot be used when a desired product is not obtained selectively in sequential chemical reaction, unless the residence time in the first step before reaction in the next secondary step is, for example, shorter than approximately 0.1 second. For example when halogen-lithium exchange reaction is carried out in such a microreactor (JP-A-2006-241065), the volume of the junction region of the microdevice becomes too large for favorable reaction.

Alternatively, devices containing microchannels produced by laminating glass substrates or metal substrates or those containing the accumulation thereof were studied (JP-A-10-337173 and JP-A-2005-161125). However, with these devices, it was necessary to produce the device once again with significant modification, if there was change in the residence time even in one step of its multistage steps. It is also difficult structurally to control the temperature in each mixing step independently, restricting the scope of its application.

SUMMARY OF THE INVENTION

The present invention resides in a microdevice for multistage-mixing of process fluids which comprises a plurality of freely-detachable units connected to each other without using pipes, wherein a microchannel for flow of the process fluids and a channel for flow of a heat-exchange medium are formed in the microdevice by mutual connection of a plurality of the units and the microdevice is locally and independently temperature-controllable.

Other and further features and advantages of the invention will appear more fully from the following description, appropriately referring to the accompanying drawings.

DETAILED DESCRIPTION OF THE INVENTION

According to the present invention, there is provided the following means.

(1) A microdevice for multistage-mixing of process fluids which comprises a plurality of freely-detachable units connected to each other without using pipes (pipeless), wherein a microchannel for flow of the process fluids and a channel for flow of a heat-exchange medium are formed in the microdevice by mutual connection of a plurality of the units and the microdevice is locally and independently temperature-controllable.

(2) The multistage-mixing microdevice according to the item (1), wherein a heat exchange capacity of a heat exchange structure formed by mutual connection of a plurality of the units is 100 K/s or more as a temperature change per unit time.

(3) The multistage-mixing microdevice according to the item (1) or (2), wherein a channel capacity of a microchannel where a plurality of process fluids do not face the heat-exchange medium is 1 ml or less, which microchannel is located between a microchannel where a plurality of process fluids face the heat-exchange medium when a plurality of the process fluids are mixed at a particular stage and a microchannel where a plurality of process fluids face the heat-exchange medium when a plurality of the process fluids are mixed at the next stage.

(4) The multistage-mixing microdevice according to any one of the items (1) to (3), wherein the microchannel for flow of the process fluids and the channel for flow of the heat-exchange medium are composed by multiple concentric cylindrical channels formed by mutual connection of a plurality of the units, wherein a device region of the multiple concentric cylindrical channels has a structure in which an outer circular tube part forms an outer wall of the microchannel and a tip-sealed cylindrical part is formed therein, and the outer circular tube part and the cylindrical part form the cylindrical microchannel allowing flow of the process fluids in thin film-shaped laminar flow, wherein the cylindrical part further has an inner circular tube part, and the inner circular tube part and the cylindrical part form the cylindrical channel allowing flow of the heat-exchange medium, with the heat-exchange medium after heat exchange being discharged through a cavity inside the inner circular tube part.

(5) The multistage-mixing microdevice according to any one of the items (1) to (4), wherein a unit at least partially made of a heat insulator is formed between a fluid-supplying unit for supplying the process fluids and a fluid mixing unit for mixing the process fluids.

(6) The multistage-mixing microdevice according to any one of the items (1) to (5), having a structure in which a plurality of currents of process fluids introduced from the fluid-supplying unit are confluently flown in the microchannel, and after that, the confluent fluid is mixed with another process fluid separately introduced.

(7) The multistage-mixing microdevice according to any one of the items (1) to (6), wherein an equivalent diameter of the microchannel is 1 µm to 1,000 µm.

(8) The multistage-mixing microdevice according to any one of the items (1) to (7), wherein an equivalent diameter of a region of the microchannel for flow of process fluids facing the heat-exchange medium is 1 µm to 1,000 µm.

(9) The multistage-mixing microdevice according to any one of the items (1) to (8), wherein a period of time between when process fluids are mixed at a particular stage and when the process fluids are mixed at the next stage is 1 second or less.

(10) The multistage-mixing microdevice according to any one of the items (1) to (9), wherein at least two process fluids are mixed for reaction.

Hereinafter, the present invention will be described in detail.

The multistage-mixing microdevice of the present invention is a device which comprises a plurality of freely-attachable and detachable units connected to each other without using pipes (pipelessly) for multistage-mixing of process fluids. A microchannel for flow of the process fluids and a channel for flow of a heat-exchange medium in the microdevice are formed by mutual connection of a plurality of the units. In addition, the microdevice is designed to be temperature-controlled locally and independently.

In the present invention, the "process fluid" means a gas, a liquid, or a liquid mixture that may be handled as liquid for use in reaction or mixing. The liquid mixture that may be handled as liquid is, for example, a liquid containing a solid and/or a gas, and may be, for example, a liquid mixture containing micro solid such as powder (e.g., metal fine particles) and/or fine air bubbles. The liquid may contain another kind of liquid that is not dissolved therein, and thus, may be, for example, an emulsion. The process fluids also include supercritical fluid or subcritical fluid. When the fluid is a gas, the fluid may contain a solid or the fine particles of the solid.

The equivalent diameter of the microchannel in the microdevice of the present invention is preferably 1 mm or less, more preferably 1 µm to 1,000 µm, and particularly preferably 10 to 500 µm. In particular, the equivalent diameter of the confluent channel described below (tubular channels 43 and 93) is preferably determined in the range above. The length of the channel is not particularly limited, but preferably 1 mm or more and 10 m or less, more preferably 5 mm or more and 10 m or less, and particularly preferably 10 mm or more and 5 m or less. The equivalent diameter as used herein will be described below. The equivalent diameter is a term also called a corresponding diameter, which is, in the present invention, used as a meaning generally mechanical engineering field. If a cylindrical tube equivalent to the tube (channel in the present invention) having any sectional shape is assumed, the diameter of the equivalent cylindrical tube corresponds to the equivalent diameter. The equivalent diameter ($d_{eq}$) is defined as $d_{eq}=4A/p$ in which A is a sectional area of the tube, and p is a wetted perimeter length (circumferential length) of the tube. In the case of the cylindrical tube, this equivalent diameter corresponds to the diameter of the cylindrical tube. The equivalent diameter is used for presuming fluidity or heat conducting characteristic of the tube on the basis of data of the equivalent cylindrical tube, and expresses a spatial scale (a representative length) of a phenomenon. The equivalent diameter is: $d_{eq}=4a^2/4a=a$ in a squared pipe having a side (a); $d_{eq}=a\cdot\sqrt{3}$ in an equilateral triangular tube having a side (a); and $d_{eq}=2$ h in a flow between paralleled plates having a channel height (h) (see, for example, edited by Nippon Kikai Gakkai, "Kikai Kougaku Jiten," 1997, published by Maruzen, K. K.).

When causing water to flow into a tube, inserting a narrow tube into the tube along the central axis thereof and then injecting a colored solution into the water, the colored solution flows in the form of a single line while the flow velocity of the water is small or slow. Thus, the water flows straightly and in parallel to the wall of the tube. However, when the flow velocity is raised to reach a given flow velocity, turbulence is suddenly caused in the water flow. Consequently, the colored solution is mixed with the water flow so that the whole of the solution and water becomes a colored flow. The former flow is called laminar flow, and the latter flow is called turbulent flow.

Whether a flow turns to a laminar flow or turbulent flow depends on whether or not the Reynolds number, which is a dimensionless number showing the state of the flow, is not more than a given critical value. As the Reynolds number is smaller, a laminar flow is more apt to be caused. The Reynolds number Re of the flow in a tube is represented by the following equation:

$$Re = D \langle v_x \rangle \rho / \mu$$

wherein D represents the equivalent diameter of the tube, $\langle v_x \rangle$ represents the sectional average velocity, $\rho$ represents the density of the flow, and $\mu$ represents the viscosity of the flow. As can be understood from this equation, the Reynolds number is smaller as the equivalent diameter is smaller. Therefore, in the case that the equivalent diameter is in the order of µm, a stable laminar flow is apt to be formed. In addition, because the physical properties of the solution, such as the density and the viscosity thereof, also have influence on the Reynolds number. As the density is smaller and/or the viscosity is larger, the Reynolds number is smaller. It can be, therefore, understood that a laminar flow is apt to be formed in that case.

The Reynolds number representing such a critical value is called "critical Reynolds number". The critical Reynolds number is not necessarily definite. However, roughly, the following values can be criteria:

Re<2,300 laminar flow;
Re>3,000 turbulent flow, and
3,000>Re>2,300 transition state.

As the equivalent diameter of a channel is smaller, the surface area per unit volume (specific surface area) thereof is larger. When the channel turns into a micro-scale of 1 mm or less, which is preferable size, the specific surface area becomes remarkably large so that the conduction efficiency of heat through the wall of the channel becomes very high. Since the heat conduction time (t) of a fluid flowing in the channel is represented by: $t=d_{eq}^2/\alpha$ (in which $\alpha$ is the heat diffusion rate of the fluid), the heat conduction time becomes shorter as the equivalent diameter becomes smaller. That is, if the equivalent diameter becomes 1/10, the heat conduction time becomes 1/100. Thus, when the equivalent diameter is in a micro-scale, the heat conduction speed is very high. Such a reaction field is defined as microreaction field.

The microdevice of the present invention is a device wherein two or more process fluids supplied in different flows are fed into a confluent region independently and are mixed to or brought into reaction with another process fluid at a point before, in, or after the confluent region, or alternatively, it is preferable that a device wherein the process fluids are mixed (and as needed brought into reaction by mixing) in the channel before or after the confluent region or in the channel including the confluent region over a particular period of time. The phrase "fluids supplied independently" means that the fluids fed into the microdevice are supplied to the confluent region separately through different channels, and the fluids in different currents do not flow through the same channel. The terms "confluence" and "mixing" are used differently in the present invention, and the "confluence" means that a plurality of currents of one or two or more kinds of fluids form a single current in contact with each other, while the "mixing" means simple mixing of two or more kinds of fluids.

In the microdevice of the present invention, a plurality of fluids are supplied into the microchannel and may be flown confluently in the confluent region as needed as described above. The process fluids may be mixed, brought into reaction, or heat-exchanged at a point before, in, or after the confluent region or in a particular region of the microchannel. The microdevices include widely devices having a microchannel, which are divided conceptually into micromixers mainly used for mixing, microreactors mainly used for reaction, and micro-heat exchangers mainly used for heat exchange.

A preferable method of producing the channels of the microdevice of the present invention will be described below. When the equivalent diameter of the channel is in the size of 1 mm or more, it is possible to produce the channel relatively easily by using a conventional machine processing technology. However, it becomes quite difficult to form them when the channel is in the microsize of 1 mm or less, especially of 500 μm or less. The micro-sized channel (microchannel) is often formed on a solid substrate by a micro manufacturing technology. The substrate material is arbitrary, if it is a stable material resistant to corrosion. Examples thereof include metals (such as stainless steel, hastelloy (nickel-iron alloy), nickel, aluminum, silver, gold, platinum, tantalum and titanium), glass, plastics, silicones, Teflon (registered trade name), ceramics, and the like. A synthetic resin material having smaller heat-transfer coefficient is preferably for the heat insulator region of the microdevice of the present invention. The synthetic resin is, for example, a fluoroplastic resin, an acrylic resin, a polyimide resin or the like, and in particular, from the viewpoints of strength, heat resistance, and acid and alkali resistance, a polyimide resin is preferably for the parts of heat-insulating unit.

Typical examples of the micro manufacturing technologies used in production of microchannels include LIGA (Roentgen-Lithographie Galvanik Abformung) technology by using X-Ray lithography, high-aspect-ratio photolithography by using EPON SU-8 (trade name), micro electro discharge machining (μ-EDM), high-aspect-ratio processing of silicon by Deep RIE (Reactive Ion Etching), hot embossing, optical modeling, laser processing, ion beam processing, mechanical micromachining by using a microtool of a hard material such as diamond, and the like. These technologies may be used alone or in combination. Preferable micro manufacturing technologies include LIGA technology using X-Ray lithography, high-aspect-ratio photolithography by using EPON SU-8, micro electro discharge machining (μ-EDM), and mechanical micromachining. Recently, application of fine injection molding technology to engineering plastics is also under study.

A junction technology is often used in preparation of microchannels. Generally junction technologies are divided grossly into solid-phase and liquid-phase bonding method, and the typical bonding methods generally used in solid-phase bonding include pressure welding and diffused junction, and those in liquid-phase bonding include welding, eutectic bonding, soldering, adhesion, and others. A high-precision junction method higher in dimensional accuracy without degradation of the material by high-temperature heating or breakdown of the microstructure such as channel by large deformation is desirable for assembly, and examples of such methods include silicon direct bonding, anodic bonding, surface-activated bonding, direct junction by hydrogen bonding, bonding by using aqueous hydrogen fluoride solution, eutectic gold-silicon junction, void-free adhesion, and the like.

In the microdevice of the present invention, it is possible to control the temperature of the process fluids locally and independently, by using a heat insulator for example of a super engineering plastic in the unit. The super engineering plastic used for the heat insulator is preferably a thermoplastic resin having a strength of 500 kgf/cm$^2$ or more, more preferably having additionally a bending elastic modulus of 2.4 GPa (24,000 kgf/cm$^2$) or more and a heat resistance of 150° C. or higher. Among superengineering plastics, crystalline resins include polyether ether ketone (PEEK) and polyphenylene sulfide (PPS), and amorphous resins include polysulfone (PSF), polyether sulfone (PES), polyimide (PI), polyether imide (PEI), polyamide-imide (PAI), and polyarylate (PAR).

PEEK, a resin having high heat resistance among aromatic polyether ketones, has a glass transition temperature of 143° C., a melting point of 334° C., a short-term heat resistance at 300° C. or higher, and a long-term heat resistance at 250° C. It also has preferable fatigue resistance and can be used as a molding material in applications demanding high performance. For example, it is used widely as tubes and tube joints for HPLC, in which a solution, to which use of stainless steel is undesirable from the viewpoints of heat resistance, corrosion resistance, and pressure resistance, is used. Alternatively, another resin having high heat-resistance temperature is an aromatic polyimide resin, and, for example the molded article "CEPLA" of a wholly aromatic polyimide resin prepared from biphenyltetracarboxylic dianhydride (BPDA) and a diamine by polycondensation has a heat-resistance temperature of as high as 500° C. and a continuous heat-resistance temperature of 300° C.

Hereinafter, the microdevice of the present invention will be described more specifically with reference to drawings.

Figure 1A:
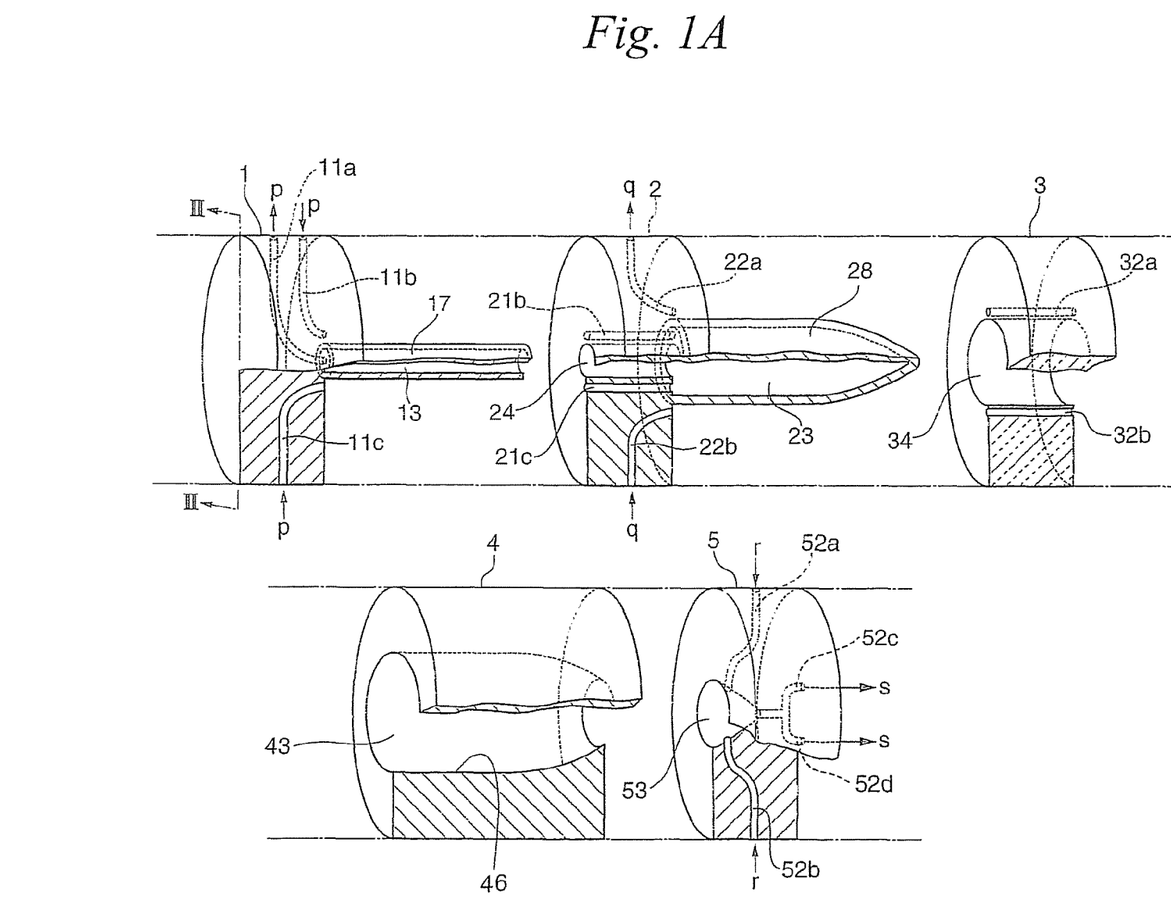
FIG. 1A is a schematic decomposed perspective, partially cutaway, view illustrating the sequential two-stage-mixing microdevice (units 1 to 5) in an embodiment of the present invention.
Figure 1B:
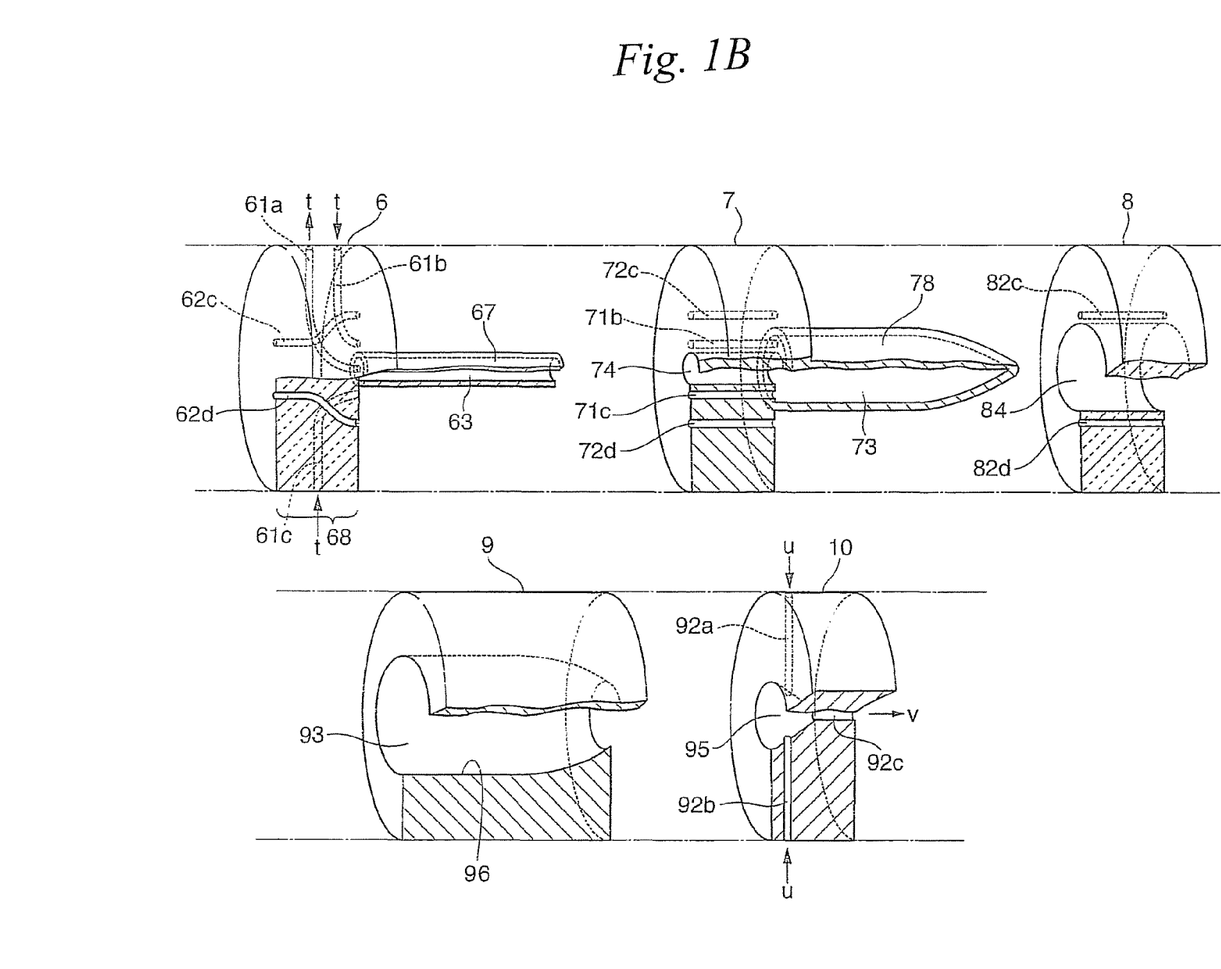
FIG. 1B is a schematic decomposed perspective, partially cutaway, view illustrating the sequential two-stage-mixing microdevice (units 6 to 10) in an embodiment of the present invention.
Figure 2:
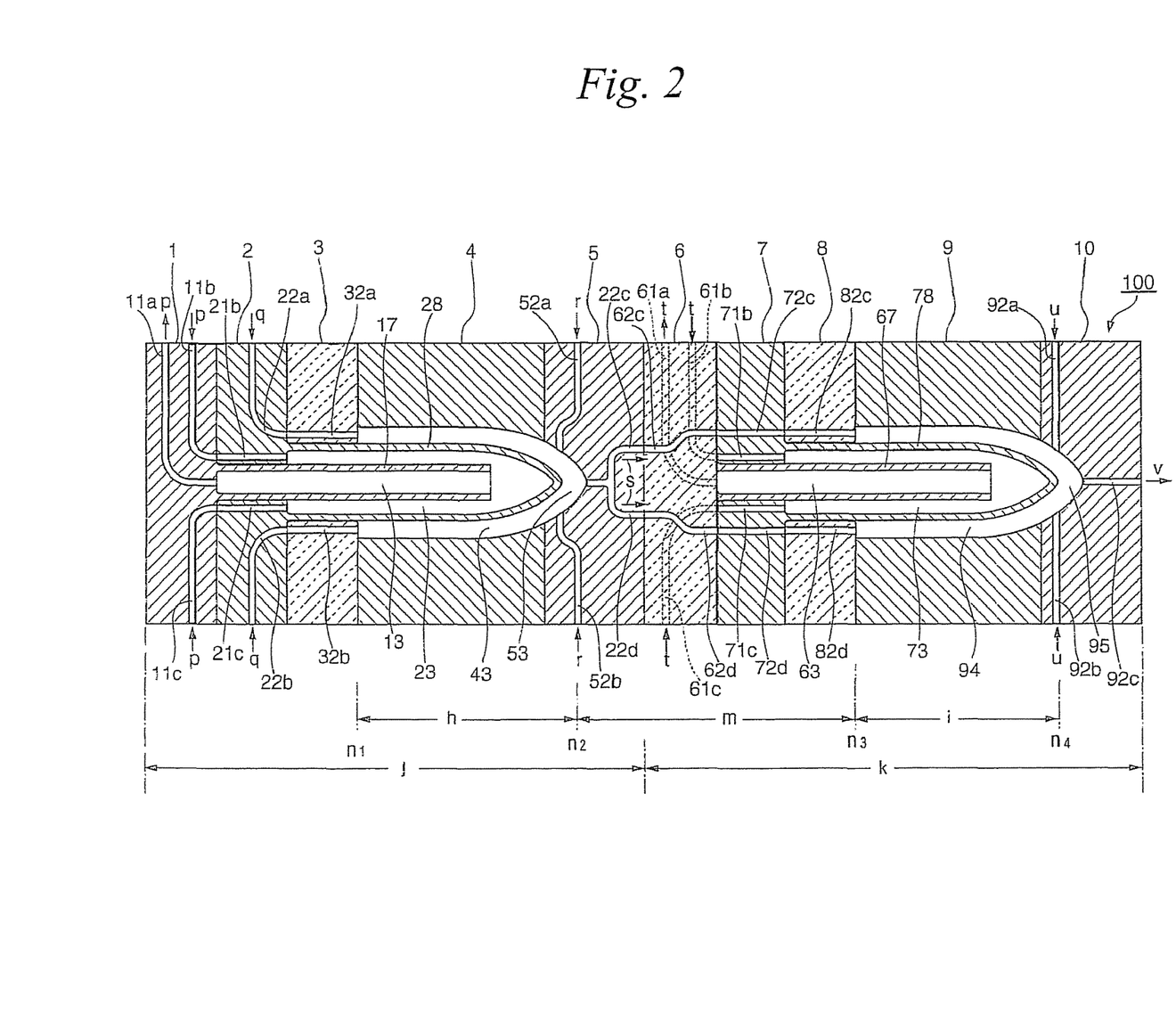
FIG. 2 is a sectional view illustrating the cross-sectional area taken on line II-II of the device shown in FIG. 1 after assembly.

FIG. 1 (FIGS. 1A and 1B) is a schematic decomposed perspective, partially cutaway, view illustrating the sequential two-stage-mixing microdevice in an embodiment of the present invention. Units 1 to 5 are shown in FIG. 1A and units 6 to 10 in FIG. 1B. FIG. 2 is a sectional view illustrating the cross-sectional area taken on line II-II of the device shown in FIG. 1 after assembly. The unit 1 has a circular tube 17 having an opening in the terminal protruding region, and the circular tube 17 is inserted into a through hole 24 of unit 2 tightly. Then, Channel (cavity) 13 inside the circular tube 17 forms a fluid-discharging channel of a heat-exchange medium p after heat exchange, together with channel 11a. The heat-exchange medium p is fed through channels 11b and 11c to the outer region of the circular tube 17, into the tubular channel 23 formed by connection of the units 1 and 2 to each other. Then, it is discharged out of the channel 13 as described above.

A process fluid q is fed, through the channels 22a and 22b of unit 2 and the channels 32a and 32b of unit 3, into a channel 43 in a hollow pencil-shaped structure that is enclosed by an outer wall 46 in unit (circular tube) 4. The cylindrical part 28 in unit 2 has a hollow pencil structure with its tip closed. The unit 3 is made of a heat-insulating material, and the cylindrical part 28 of unit 2 is inserted tightly into the through hole 34 of unit 3. The unit 4 has a pencil-shaped, hollow-structured outer wall 46 having a function as an outer wall for heat exchange between the process fluid q and the heat-exchange medium p. The cylindrical part 28 of unit 2 and the outer wall 46 of unit 4 jointly form a gap in the pencil-like circular tube shape. The gap represents the microchannel (confluent region) 43, in which the process fluid q flows, preferably by flaky (thin film-shaped) laminar flow.

The process fluid q and a process fluid r supplied via channels 52a and 52b are mixed at a channel (mixing region) 53 of unit 5. The process fluid s formed by mixing is divided in two channels and sent from the first mixing step j (FIG. 2) through channels 52c and 52d to the second mixing step k. Then, the process fluid s is fed smoothly through the unit 6 without contact with the heat-exchange medium t and then through units 7 and 8, into the unit 9 at the second mixing step k.

The cylindrical region 68 of unit 6 is made of a heat-insulating material, while the circular tube 67 is made of stainless steel. As described above, the heat-exchange medium t is supplied through channels 61b and 61c and discharged through the channel 63 in the circular tube 67 out of the channel 61a, while it is separated from the process fluid s flowing through the channels 62c and 62d. Unit 7 has cylindrical part 78 in the hollow pencil structure with its one end closed. The process fluid s is supplied through channels 72c and 72d to the region outside the cylindrical part 78, while the heat-exchange medium t is supplied through channels 71b and 71c into the cylindrical channel 73. In Unit 8, which is made of a heat-insulating material, the cylindrical part 78 of unit 7 is inserted tightly into and connected to the through hole 83. The process fluid s is supplied through channels 82c and 82d to cylindrical channel (confluent region) 94 in the next unit 9. Unit 9 has an outer wall 96 in the pencil-shaped hollow structure having a function as an outer wall where the process fluid s and the heat-exchange medium t are heat-exchanged with each other. The cylindrical part 78 of Unit 7 and the outer wall 96 of unit 9 form a pencil-shaped cylindrical gap, wherein the process fluid s flows, preferably in flake-shaped laminar flow.

At the Unit 10, the process fluid s flowing in the channel (mixing region) 95 and a process fluid u supplied from the channels 92a and 92b are mixed. The fluid v obtained after mixing is discharged through a channel 92c out of the device.

In the present embodiment, the material for the unit 1, 2, 4, 5, 7, 9 or 10 is not particularly limited, if it is a heat-conductive material, but preferably SUS316. Also in the present embodiment, the material for the unit 3, 6 or 8 is not particularly limited, if it has a particular region of a heat-insulating material, but the material for the unit 3 or 8 is preferably CEPLA. Preferably as described above, the unit 6 has the cylinder region 68 of CEPLA and the protruding circular tube 67 of SUS 316.

In the present embodiment, the five kinds of fluids, process fluids q, r, and u and fluids for temperature control (for heat exchange) p and t, are supplied to the multistage-mixing microdevice, and these fluids are supplied into the device from outside, as indicated by the arrow in FIGS. 1 and 2. Then, fluids q and r are mixed (possibly with reaction between them) to give fluid s at the first mixing step j, and the fluids s and u are mixed at the second mixing step k (possibly with reaction between them), to give fluid v.

The device of the present embodiment has ten units, specifically units 1 to 10, in the cylindrical shape. No pipe for connecting the channels is needed for assembly, and these units may be connected to each other integrally with bolts and nuts, while boreholes penetrating the cylinders of respective units in the peripheral region are formed at the same interval. In the microdevice of the present embodiment, each fluid-feeding channel is formed in parallel with the cross section taken on the line II-II of FIG. 1, but such a feed channel may be formed, for example, in the direction perpendicular thereto. Typically in the unit 2, in addition to the feed channels 22a and 22b, two other feed channels may be formed in the direction perpendicular thereto, making a total of four feed channels. Alternatively, the feed channel 22a and 22b and four other channels may be formed, making a total of six radially feeding channels. An increased number of feed channels installed leads to easier confluence of the fluids in the confluent channel 43, which is preferable for uniform heat exchange.

The "heat exchange structure" in the device of the present embodiment that is formed by mutual connection of a plurality of units will be described in more detail. In the present embodiment, in the heat exchange structure (heat exchange region) h of the first mixing step j, a double-cylinder channel structure having cylindrical channels 23 and 43 is formed while units 1 to 5 are connected to each other. In this way, the residence temperature of the fluids q, r, and s is controlled. Alternatively, the residence time of the fluids can be controlled, for example, by modifying, the unit 3 according to the flow rate of the fluid s and adjusting the channel length or width of the channel extending to the mixing region 53. More specifically in the microdevice of the present embodiment, process fluids q and r are supplied respectively from the feed channels of units 2 and 5, to the unit 5 having the mixing region 53. The process fluid q introduced from the unit 2 is heat-exchanged with the heat-exchange medium p flowing in the channel 23 during it is conveyed through the heat insulator unit 3 in the cylindrical gap channel 43 of the region h where the process fluid faces the heat-exchange medium. In this way, the fluid q is supplied to the mixing region 53 of unit 5 as it is temperature-controlled (in the present invention, the phrase that the process fluid faces the heat-exchange medium means that the process fluid is influenced thermally by the heat-exchange medium as heat source or that heating or cooling of the process fluid proceeds faster than natural change). Then, the heat-exchange medium (fluid for temperature control) p is supplied form the unit 1 and exchanges heat with the process fluid q flowing in the region h while it is fed through units 2 and 3. Then, the heat-exchange medium p passes through the most central channel 13 of unit 4 and is discharged through units 3 and unit 2 out of unit 1. The process fluid q thus heat-exchanged can be brought into collision or contact with the process fluid r at desired temperature in the mixing region 53 of unit 5.

If the fluids to be mixed are reactive to each other, the process fluids q and r react with each other by contact in the mixing region 53, giving a fluid s that is or contains the reaction product. Then, the process fluid s, mixture of process fluids q and r, is divided in unit 5 and sent to the second mixing step k. The process fluid s is fed through heat insulator unit 6, unit 7, and heat insulator unit 8, into the channel 94 of cylindrical gap in the heat exchange unit 9, where it is heat-exchanged and temperature-controlled with the heat-exchange medium t flowing in the channel 73. Thus, the process fluid s is heated to a desired temperature in the region i where it faces the heat-exchange medium t, and supplied into the confluent region 95.

If the process fluids q and r are fluids reactive to each other, it is possible to continue the reaction between them during flow through the microchannel at the second mixing step k, for example, at a temperature different from that at first mixing step j in the heat exchange structure i. The width of the cylindrical gap (channel 94) formed by the units 7 and unit 9 may be then so adjusted that the first-stage reaction of two-stage sequential reaction is carried out for an optimal reaction period, or the residence time in the region from channel 94 to mixing region 95 may be modified by adjustment of the total length of the unit 9. In elongating the residence time from the original setting, it is more preferable to change the length of unit 9 and thus to elongate the length of channel 94, than to widen the cylindrical gap (width of channel 94), from the viewpoint of heat exchange efficiency. For control of the reactivity of the process fluid s as described above, it is also possible to adjust the temperature of the heat-exchange medium t to make the temperature of the mixture of process fluids q and r constant or heat or cool the process fluid rapidly by using its high heat exchange efficiency.

The heat-exchange medium t is supplied from the unit 6 and sent through units 7 and 8 into the heat exchange structure (heat exchange region) i where the heat-exchange medium t faces and heat exchanges with the process fluid s. Then, the fluid t passes through the most central channel 63 of the unit 9 and is discharged through units 8 and 7 out of the unit 6. In this way, the heat-exchanged process fluid s can be brought into collision and contact with the process fluid u in the confluent region 95 of unit 10. If the fluids to be mixed are reactive to each other, contact between the process fluids s and u results in reaction, giving a fluid v that is or contains the reaction product.

The heat exchange capacity, as indicated by the temperature change per unit time, of the heat exchange structure formed by connecting a plurality of units is preferably 100 K/s or more, more preferably 200 to 2,000 K/s. The equivalent diameter of the channel for the heat-exchange medium is preferably 10 mm or less, more preferably 0.01 to 1 mm. The heat exchange structure (region m) where the process fluid does not face the heat-exchange medium, which is located between the heat exchange structure (region h) where the process fluid faces the heat-exchange medium when a plurality of process fluids are mixed at a particular stage (phase) and the heat exchange structure (region i) where the process fluid faces the heat-exchange medium when a plurality of process fluids are mixed at the next stage, preferably has a channel capacity of 1 ml or less, more preferably 0.01 to 0.1 ml.

The period of time between when a plurality of process fluids are mixed at a particular stage and when a plurality of process fluids are mixed at the next phase (period of the process fluid passing through sites n2 to n4) is preferably 1 second or less, more preferably 0.001 to 0.1 second.

Further in the present invention, it is preferable to form a heat-insulating structure region in the device for control of the temperature of the fluids locally and independently. Specifically, it is desirable to install a unit at least part of which is made of a heat insulator (the unit 3 or 8), between the fluid-supplying unit for supplying the process fluid (e.g., the unit 1 or 6 in the embodiment above) and the fluid mixing unit for mixing the process fluids (the unit 5 or 10).

A preferable embodiment of the microdevice of the present invention has been described so far, but the present invention is not limited to the embodiment. In the embodiment above, sequential two-stage mixing of three kinds of process fluids (q, r and u) was described. The multistage-mixing microdevice of the present invention may be a two- or more-stage mixing microdevice, and thus, it is possible to increase the number of mixing stages, for example to produce sequential three- or four-stage mixing microdevice efficiently without complicated operation, by adding the units according to the desirable number of the sequential mixing stages. Thus, the multistage-mixing microdevice of the present invention is flexibly compatible with various mixing methods and reaction conditions. In the microdevice of the present invention, it is also possible to secure the heat-exchange transfer area while preserving a dimensional accuracy thereof at the micrometer order, by forming a fluid-supplying microchannel and a heat exchange medium channel by means of connecting a plurality of units without using pipes. In addition, it is also possible by modifying the channel length to make the residence time a desirable value while preserving favorable dimensional accuracy, heat exchange efficiency, and fluid flow rate. For the reasons above, the microdevice of the present invention can be used favorably, for example, in chemical reactions demanding precise control which were conventionally difficult and also in production of compounds demanding modification of various conditions.

The microdevice of the present invention can be used for mixing and/or reaction of fluids. It also allows precise control of temperature and residence time of fluids, which was quite difficult to accomplish in fine channels, and enables uniform mixing and reaction or improves selectivity of the desired product in the case of continuous reaction. The microdevice of the present invention having such advantageous functions would find applications in various chemical processes. Specifically, it can be used favorably in mixing and reaction as a microdevice or microreactor mixing two or more fluids at multistages for use in chemical and pharmaceutical industries.

The microdevice of the present invention can achieve excellent effect that microchannels with high-precision dimension are formed by pipeless connection of connecting a plurality of units to each other, wherein multistage-mixing of process fluids can be performed and temperature and residence time can be controlled independently at each step for flow of the process fluids. In addition to the favorable properties above, the microdevice of the present invention, which secures sufficiently high flow rate of the process fluids while realizing short residence time arid high heat exchange efficiency, enables high-precision mixing and high-precision chemical reaction that are conventionally considered difficult. Further, the microdevice of the present invention can cope with modification in residence time and/or fluid temperature by addition, elimination, or alteration only of a particular unit, without an additional step of producing the entire device once again. For example, the microdevice of the present invention exhibits excellent effect that the number of the mixing steps can be simply and freely increased or decreased.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2007-210487 filed in Japan on Aug. 10, 2007, which is entirely herein incorporated by reference.

What we claim is:

1. A microdevice for multistage-mixing of process fluids which comprises a plurality of freely-detachable units connected to each other without using pipes, wherein a microchannel for flow of the process fluids and a channel for flow of a heat-exchange medium are formed in the microdevice by mutual connection of a plurality of the units and the microdevice is locally and independently temperature-controllable, the microdevice further comprising a heat-exchange region having:
- a process fluid channel having a hollow pencil-shaped structure; and
- a heat-exchange medium channel formed inside the hollow structure of the process fluid channel,
- wherein said heat-exchange medium and at least one of said process fluids are separated from each other by the hollow pencil-shaped structure.

2. The multistage-mixing microdevice according to claim 1, wherein a heat exchange capacity of said heat exchange structure is 100 K/s or more as a temperature change per unit time.

3. The multistage-mixing microdevice according to claim 1, wherein a channel capacity of a microchannel where a plurality of process fluids do not face the heat-exchange medium is 1 ml or less, which microchannel is located between a microchannel where a plurality of process fluids face the heat-exchange medium when a plurality of the process fluids are mixed at a particular stage and a microchannel where a plurality of process fluids face the heat-exchange medium when a plurality of the process fluids are mixed at the next stage.

4. The multistage-mixing microdevice according to claim 1, wherein a unit at least partially made of a heat insulator is formed between a fluid-supplying unit for supplying the process fluids and a fluid mixing unit for mixing the process fluids.

5. The multistage-mixing microdevice according to claim 1, having a structure in which a plurality of currents of process fluids introduced from the fluid-supplying unit are confluently flown in the microchannel, and after that, the confluent fluid is mixed with another process fluid separately introduced.

6. The multistage-mixing microdevice according to claim 1, wherein an equivalent diameter of the microchannel is 1 μm to 1,000 μm.

7. The multistage-mixing microdevice according to claim 1, wherein an equivalent diameter of a region of the microchannel for flow of process fluids facing the heat-exchange medium is 1 μm to 1,000 μm.

8. The multistage-mixing microdevice according to claim 1, wherein a period of time between when process fluids are mixed at a particular stage and when the process fluids are mixed at the next stage is 1 second or less.

9. The multistage-mixing microdevice according to claim 1, wherein at least two process fluids are mixed for reaction.

10. A microdevice for multistage-mixing of process fluids which comprises a plurality of freely-detachable units connected to each other without using pipes, wherein a microchannel for flow of the process fluids and a channel for flow of a heat-exchange medium are formed in the microdevice by mutual connection of a plurality of the units and the microdevice is locally and independently temperature-controllable,
- wherein the microchannel for flow of the process fluids and the channel for flow of the heat-exchange medium are composed by multiple channels formed by mutual connection of a plurality of the units,
- wherein a device region of the multiple channels has a structure in which an outer tube part forms an outer wall of the microchannel and a middle tube part is formed therein, and the outer tube part and the middle tube part form the microchannel allowing flow of the process fluids in thin film-shaped flow, and
- wherein the middle tube part further has an inner tube part, and the inner tube part and the middle tube part form the channel allowing flow of the heat-exchange medium, with the heat-exchange medium after heat exchange being discharged through a cavity inside the inner tube part.

11. A microdevice for multistage-mixing of process fluids which comprises a plurality of freely-detachable units connected to each other without using pipes, wherein a microchannel for flow of the process fluids and a channel for flow of a heat-exchange medium are formed in the microdevice by mutual connection of a plurality of the units and the microdevice is locally and independently temperature-controllable,
- wherein the microchannel for flow of the process fluids and the channel for flow of the heat-exchange medium are composed by multiple channels formed by mutual connection of a plurality of the units,
- wherein a device region of the multiple channels has a structure in which an outer tube part forms an outer wall of the microchannel and a pencil-shaped hollow part is formed therein, and the outer tube part and the pencil-shaped hollow part form the microchannel allowing flow of the process fluids in thin film-shaped flow, and
- wherein the pencil-shaped hollow part further has an inner tube part, and the inner tube part and the pencil-shaped hollow part form the channel allowing flow of the heat-exchange medium, with the heat-exchange medium after heat exchange being discharged through a cavity inside the inner tube part.

12. A microdevice for multistage-mixing of process fluids which comprises a plurality of freely-detachable units connected to each other without using pipes, wherein a microchannel for flow of the process fluids and a channel for flow of a heat-exchange medium are formed in the microdevice by mutual connection of a plurality of the units and the microdevice is locally and independently temperature-controllable,
- wherein the microchannel for flow of the process fluids and the channel for flow of the heat-exchange medium are composed by multiple concentric cylindrical channels formed by mutual connection of a plurality of the units,
- wherein a device region of the multiple concentric cylindrical channels has a structure in which an outer circular tube part forms an outer wall of the microchannel and a tip-sealed cylindrical part is formed therein, and the outer circular tube part and the cylindrical part form the cylindrical microchannel allowing flow of the process fluids in thin film-shaped laminar flow, and
- wherein the cylindrical part further has an inner circular tube part, and the inner circular tube part and the cylindrical part form the cylindrical channel allowing flow of the heat-exchange medium, with the heat-exchange medium after heat exchange being discharged through a cavity inside the inner circular tube part.

13. The multistage-mixing microdevice according to claim 12, wherein a heat exchange capacity of a heat exchange structure formed by mutual connection of a plurality of the units is 100 K/s or more as a temperature change per unit time.

14. The multistage-mixing microdevice according to claim 12, wherein a channel capacity of a microchannel where a plurality of process fluids do not face the heat-exchange medium is 1 ml or less, which microchannel is located between a microchannel where a plurality of process fluids face the heat-exchange medium when a plurality of the process fluids are mixed at a particular stage and a microchannel where a plurality of process fluids face the heat-exchange medium when a plurality of the process fluids are mixed at the next stage.

15. The multistage-mixing microdevice according to claim 12, wherein a unit at least partially made of a heat insulator is formed between a fluid-supplying unit for supplying the process fluids and a fluid mixing unit for mixing the process fluids.

16. The multistage-mixing microdevice according to claim 12, having a structure in which a plurality of currents of process fluids introduced from the fluid-supplying unit are confluently flown in the microchannel, and after that, the confluent fluid is mixed with another process fluid separately introduced.

17. The multistage-mixing microdevice according to claim 12, wherein an equivalent diameter of the microchannel is 1 μm to 1,000 μm.

18. The multistage-mixing microdevice according to claim 12, wherein an equivalent diameter of a region of the microchannel for flow of process fluids facing the heat-exchange medium is 1 μm to 1,000 μm.

19. The multistage-mixing microdevice according to claim 12, wherein a period of time between when process fluids are mixed at a particular stage and when the process fluids are mixed at the next stage is 1 second or less.

20. The multistage-mixing microdevice according to claim 12, wherein at least two process fluids are mixed for reaction.

* * * * *